United States Patent
De Meno et al.

(10) Patent No.: US 6,721,767 B2
(45) Date of Patent: Apr. 13, 2004

(54) APPLICATION SPECIFIC ROLLBACK IN A COMPUTER SYSTEM

(75) Inventors: Randy De Meno, Staten Island, NY (US); Anand Prahlad, East Brunswick, NJ (US); Jeremy A. Schwartz, Red Bank, NJ (US); James J. McGuigan, Avon, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 415 days.

(21) Appl. No.: 09/876,289

(22) Filed: Jun. 6, 2001

(65) Prior Publication Data

US 2001/0029517 A1 Oct. 11, 2001

Related U.S. Application Data

(63) Continuation-in-part of application No. 09/774,302, filed on Jan. 30, 2001.
(60) Provisional application No. 60/179,343, filed on Jan. 31, 2000.

(51) Int. Cl.[7] .............................................. G06F 12/00
(52) U.S. Cl. .................... 707/204; 707/104.1; 707/203; 707/202
(58) Field of Search .................... 707/1–10, 100–104.1, 707/200–204; 709/230–232, 330; 700/79, 82, 87, 88; 711/147; 714/1, 20

(56) References Cited

U.S. PATENT DOCUMENTS

| | | | |
|---|---|---|---|
| 4,751,639 A | * 6/1988 | Corcoran et al. | 714/11 |
| 5,005,122 A | 4/1991 | Griffin et al. | 709/203 |
| 5,204,958 A | * 4/1993 | Cheng et al. | 707/102 |

(List continued on next page.)

FOREIGN PATENT DOCUMENTS

| | | | |
|---|---|---|---|
| EP | 0259 912 A | 3/1988 | G06F/11/14 |
| EP | 0 467 546 A | 1/1992 | G06F/9/46 |
| EP | 0 774 715 A | 5/1997 | G06F/11/14 |
| EP | 0 809 184 A | 11/1997 | G06F/11/14 |
| EP | 0 899 662 A | 3/1999 | G06F/11/14 |
| WO | WO 95 13580 A | 5/1995 | G06F/11/14 |

OTHER PUBLICATIONS

Sun Hwan Kim, Mi Suk Jung, Jun Hyun Park, Young Chul Park, "A Design and Implementation of Savepoints and Partial Rollblacks Considering Transaction Isolation Levels of SQL2", Department of CS, Kyungpook National University, Korea, Apr. 1999, pp. 1–10.*

(List continued on next page.)

Primary Examiner—Greta Robinson
Assistant Examiner—Linh Black
(74) Attorney, Agent, or Firm—Brown Raysman Millstein Felder and Steiner

(57) ABSTRACT

An application specific rollback system that includes a software application that performs operations requested by a user to generate application specific data. The software application has an application specific rollback module with an index for assisting in locating different states of the application specific data that were generated by the user requests. Also included in the system is a logical view storage that provides an organizational scheme for storage of the application specific data on one of a plurality of storage media, for migration of the application specific data to other ones of the plurality of storage media, for tracking the migration of the application specific data over time, and for maintaining the index of the software application. The application specific rollback module also provides access to a specific version of the application specific data when requested by a user such that the application specific data from a user selected date is accessible.

14 Claims, 4 Drawing Sheets

U.S. PATENT DOCUMENTS

| | | | |
|---|---|---|---|
| 5,212,772 A | 5/1993 | Masters | 714/20 |
| 5,347,653 A | 9/1994 | Flynn et al. | 707/203 |
| 5,448,724 A | 9/1995 | Hayashi | 714/4 |
| 5,638,509 A | 6/1997 | Dunphy et al. | 714/20 |
| 5,673,381 A | 9/1997 | Huai et al. | 714/1 |
| 5,761,677 A | 6/1998 | Senator et al. | 707/203 |
| 5,778,395 A * | 7/1998 | Whiting et al. | 707/204 |
| 6,148,412 A * | 11/2000 | Cannon et al. | 714/6 |

OTHER PUBLICATIONS

Bharat Bhargava and Shy–Renn Lian, "Independent Checkpointing and Concurrent Rollback for Recovery in Distributed Systems—An Optimistic Approach", 1998, CS Department Purdue University, Indiana, pp. 3–12.*

Luis–Felipe Cabrera, et al: "ADSM: A Multi–Platform, Scalable, Backup and Archive Mass Storage System", Digest of Papers of the Computer Society Computer Conference (Spring) Compcon, US, Los Alamitos, IEEE Comp. Soc. Press., vol. Conf. (Mar. 5, 1995), pp. 420–427.

* cited by examiner

APPLICATION SPECIFIC ROLLBACK IN A COMPUTER SYSTEM

CROSS-REFERENCE TO RELATED APPLICATIONS

This application is a continuation-in-part of U.S. patent application Ser. No. 09/774,302, entitled "Logical View With Granular Access to Exchange Data Managed by Modular Data and Storage Management Systems," filed Jan. 30, 2001, pending, which claims the benefit of U.S. Provisional Application Ser. No. 60/179,343, entitled "Logical View With Granular Access to Exchange Data Managed by Modular Data and Storage Management Systems," filed Jan. 31, 2000, all of which are incorporated by reference herein in their entireties.

BACKGROUND

1. Field of the Invention

The present invention relates to storage and retrieval systems, in particular to application specific rollback in a computer system.

2. Description of the Related Art

Typical storage and retrieval computer systems provide a user with resources to store digital files such as word processing files, email files, etc., and to retrieve the digital files when desired. These digital files of the computer system are commonly backed up to a new location on the computer system itself or even to a completely different and separate storage facility such as a magnetic tape, a different disk drive, etc. Backing up digital files provides an alternate source(s) to access the digital files when the digital files have become corrupted, lost, written over, no longer accessible due to hardware failure, etc.

One common deficiency of the storage and retrieval systems of the prior art is the inability to retrieve data that is modified between backups of the computer system. For example, if a file that is stored on a computer system is backed up at time T1, is modified three times prior to a second backup at time T2, and is then lost in a hard drive failure, the file may only be retrieved as it appeared at times T1 and T2. The first two modifications that occurred between time T1 and T2 are not retrievable.

Many other problems and disadvantages of the prior art will become apparent to one skilled in the art after comparing such prior art with the present invention as described herein.

SUMMARY OF THE INVENTION

Various aspects of the present invention may be realized through an application specific rollback system that includes a software application that performs operations requested by a user to generate application specific data. The software application has an application specific rollback module with an index for assisting in locating different states of the application specific data that were generated by the user requests. Also included in the system is a logical view storage that provides an organizational scheme for storage of the application specific data on one of a plurality of storage media, for migration of the application specific data to other ones of the plurality of storage media, for tracking the migration of the application specific data over time, and for maintaining the index of the software application. The application specific rollback module also provides access to a specific version of the application specific data when requested by a user such that the application specific data from a user selected date is accessible.

State changes in the application specific rollback system are defined to occur when various changes to the data happen. For example, when application specific data is migrated, edited, infected by a virus, altered by the virus, etc. The software application may include a scroll bar for scrolling through a list of dates that correspond to state changes in the application specific data. The application specific rollback module may include a function for providing a copy of the specific version of the application specific data that is requested by the user. The copy of the specific version of the application specific data may be saved to a storage media other than where the application specific data of interest is currently stored.

Various aspects of the present invention may also be realized through a method for retrieving information from a computer system. The method involves, not necessarily in this order, generating information with a software application; storing the information through an organizational scheme provided by a logical view storage module such that the information may be migrated through different media devices depending on factors such as access to the information, storage profiles, and file storage history; selecting a specific date and time in the history of the information when the information existed in a state that is desirable to a user; requesting the software application to access the information as the information existed at the specified date and time in the history of the information; and storing the requested information in a new location to begin a new history of the information, the new history beginning with the information as it existed at the specified date and time that was requested by the user.

Selecting a specific date and time in the history of the information may involve scrolling through a list of dates that indicate specific times when the state of the information was changed. The state change, among other things, occurs by migrating the information from one media device to another media device, by editing the information with the software program, by infecting the information with a computer virus, by altering the content of the application specific data with the virus, etc. It should be noted that storing the requested information in a new location may include storing the information at a different media device.

Other aspects of the present invention will become apparent with further reference to the drawings and specification which follow.

BRIEF DESCRIPTION OF THE DRAWINGS

A better understanding of the present invention can be obtained when the following detailed description of the drawings is considered in conjunction with the following drawings.

DETAILED DESCRIPTION OF THE DRAWINGS

Figure 1:
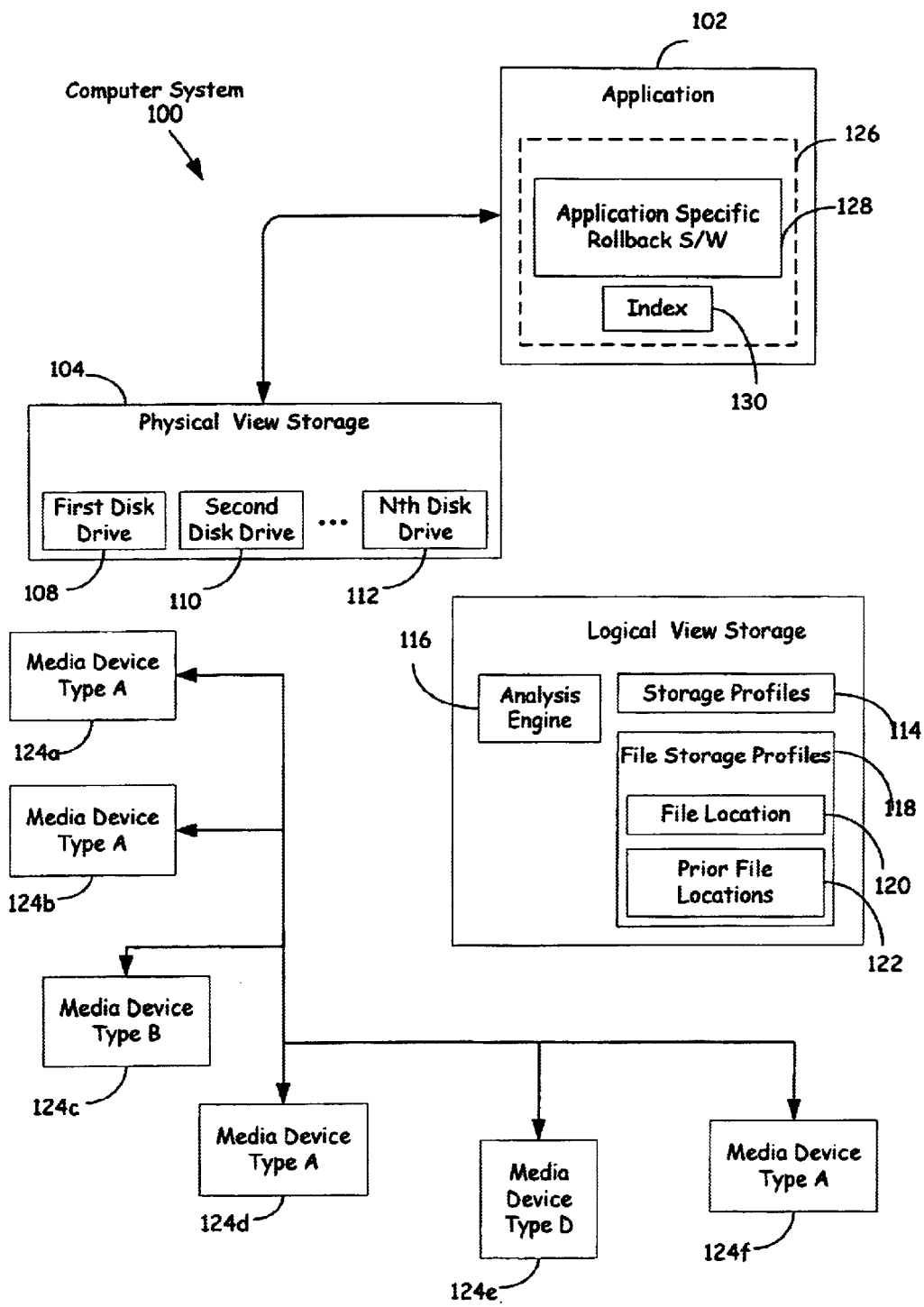
FIG. 1 is a block diagram of an exemplary computer system for performing application specific rollback operations according to principles of the present invention.

FIG. 1 is a block diagram of an exemplary computer system 100 for performing application specific rollback operations according to principles of the present invention. The computer system 100 is illustrated as an application 102 with a physical view storage 104. A logical view storage 106 provides an organizational scheme for accessing different documents/data in the computer system 100. For example, the application 102 could be a word processor that access the physical view storage 104 and access documents that have been stored on any one of a first disk drive 108, a second disk drive 110, . . . or an Nth disk drive 112. The application 102 could also access information through the logical view storage 106 from any one of a variety of media devices.

The logical view storage 106 provides the organizational scheme for storage and retrieval of information that is used in the computer system 100. Storage profiles 114 are used to determine where and how particular information is to be stored. An analysis engine 116 is used to analyze the particular information that is being stored or retrieved, and based on at least the information's storage profile and a file storage history 118, the analysis engine 116 determines the current location of the information of interest, either where to store the information or where to access the information. The file storage history 118 includes information such as a file location 120 and prior file locations 122. With the assistance of the analysis engine 116, the logical view storage 106 balances information storage among media devices (Type A, B, C, D, . . . N) 124 according to multiple factors such as factors that are found in the storage profiles 114 and the file storage history 118.

Factors include things such as how different users of the application 102 are treated for file storage access, i.e., one user has initial storage of documents in media device type A while another user has initial storage of documents in media device type B. The first user may have documents migrate from media device type A to B after a week and then from B to C after a month. The second user may only have documents migrate from media device type B to C after a month. The different storage variations are as varied as the different types of users that may use the application 102.

Another factor that could influence the organizational scheme of the logical view storage 106 is the type of application 102 that is storing or retrieving the information. For example, word processing applications may have a completely different storage scheme than spreadsheet or engineering drawing applications. Different applications may also access information at different frequencies, require different access times, perform editing or only viewing, etc., all of which could influence the organizational scheme of the logical view storage 106. The different media types 124 offer, among other things, different access times to accommodate the differing types of application 102.

The application 102 includes a module 126 that offers application specific rollback software 128. The application specific rollback software 128 may generate an index 130 that the logical view storage 106 uses in part to track a location of retrieval or storage of information in the media devices 124. In particular, the application 102 may store information "X" at a time "T1." With the passage of time, among other things, information X may be edited or moved among the different media devices 124. This change in the state of information X may be for any number of reasons, e.g., intentional or unintentional changes. Intentional changes are changes such as locational changes based on the organizational scheme of the logical view storage 106, document modifications that the user determines to be necessary for proper document usage, etc. On the other hand, unintentional changes are things like virus infection, nefarious user corruption, inadvertent document saves, etc.

The application specific rollback software 128 allows information X to be recovered immediately prior to undesired changes in the information. The logical view storage 106 keeps a history of information X so that, for example, a user may recover information X at time T1 if the user so desires. Incremental changes to information X may also be recovered, e.g., at times T2, T3, etc., depending upon the granularity of the application specific rollback software 128, i.e., each change in information X could be tracked such that a state of information X could be recovered, e.g., at the exact point that information X was undesirably changed. The application specific rollback software 128 is able to perform this function because of the analysis engine 116, the file storage history 118, and the index 130. Of course, those skilled in the art and viewing the present disclosure will understand that variations exist in the tools that are used to retrieve different states of the information X at different times than that time T1.

Figure 2:
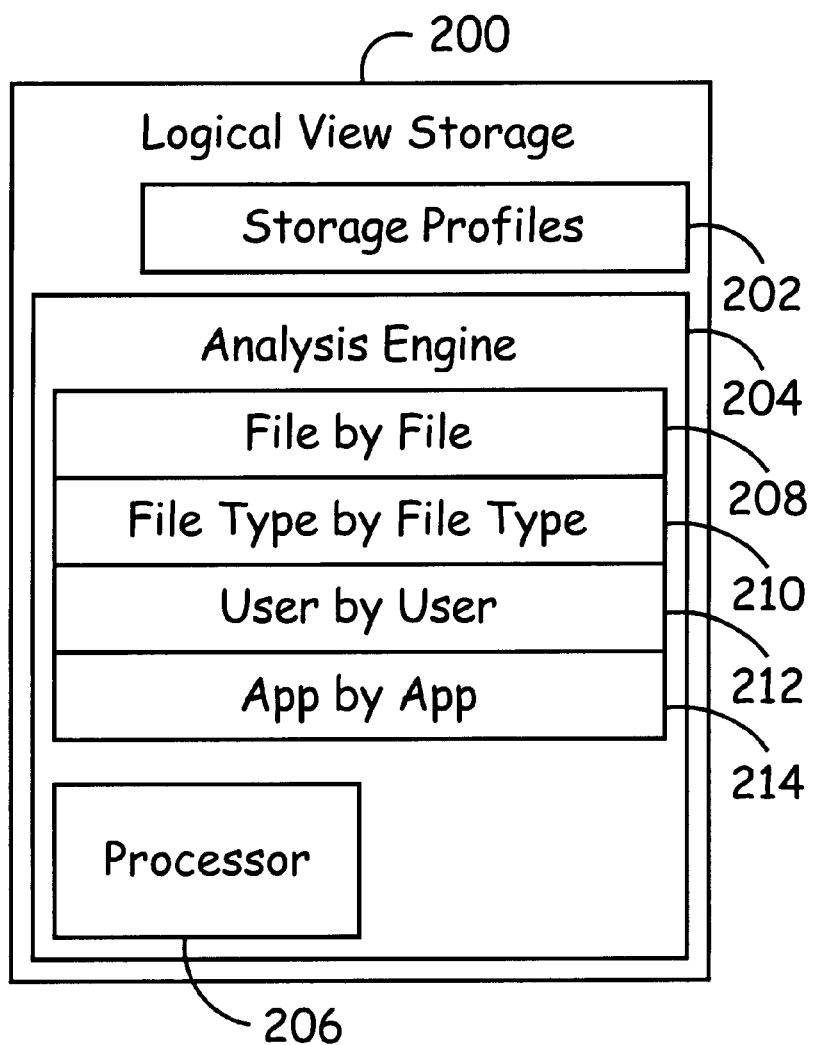
FIG. 2 is a block diagram of an exemplary logical view storage that may be used in the computer system of FIG. 1.

FIG. 2 is a block diagram of an exemplary logical view storage 200 that may be used in the computer system 100. The logical view storage 200 includes storage profiles 202 and an analysis engine 204. The analysis engine 204 includes a processor 206 that determines storage and retrieval information based the storage profiles 202 and certain other characteristics such as "file by file" 208, "file type by file type" 210, "user by user" 212, "app by app" 214, etc.

Figure 3:
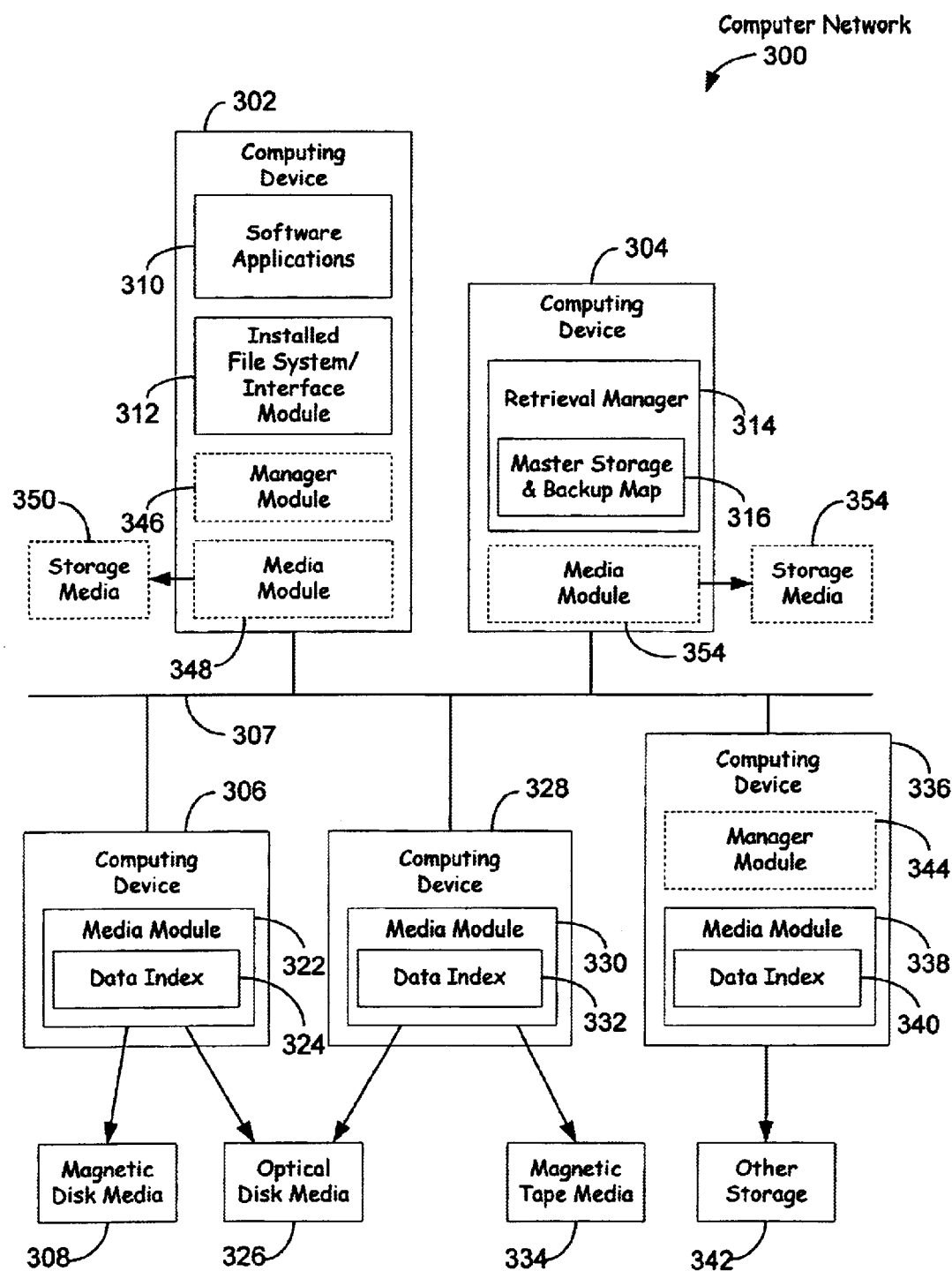
FIG. 3 is a block diagram of a computer network that operates with a computer system such as the computer system of FIG. 1.

FIG. 3 is a block diagram of a computer network 300 that operates with a computer system such as the computer system 100.

The computer network 300 includes a computing device 302, a computing device 304, and a computing device 306 that are interconnected and communicate with one another via a network 307. The computing device 306 includes a magnetic disk media 308 for storage of data that the computing device 306 receives from the computing device 302.

The computing device 302 includes software applications 310 and installed file system 312. The installed file system 312 works with an interface module to retrieve data in the computer network 300. When data is to be retrieved for the software application 310, the installed file system/interface module 312 begins interacting with a retrieval manager 314 of the computing device 304. The retrieval manager 314 includes a master storage and backup map 316. In this embodiment, when the software application 310 is directed to retrieve data, the data is sent to the installed file system/interface module 312 and then to the software applications 310. To find the location of the data that is to be retrieved, the retrieval manager 314 views the information in the master storage and backup map 316. The information from the retrieval manager 314 is passed to the installed file system/interface module 312 so that the computing device that knows the exact location of the data is then known and can be retrieved from the storage media.

For example, computing device 306 may be where the system looks to retrieve the data of interest. The computing device 306 includes a media module 322 having a data index 324 that would indicate the specific location of the data to be retrieved. This data will be stored in a storage media such as the magnetic disk media 308 or optical media 326. Of course, other types of storage media are available and more than two storage media could be available from the computing device 306. When the data is found, it is then passed back to the software applications 310 through the network 307.

The retrieval manager 314 of the computing device 304 may indicate that the data is stored at computing device 328 based on the information found on the master storage and backup map 316. In this case, the computer network 300 must look to a media module 330 of the computing device 328 where a data index 332 indicates the exact location of the data to be retrieved. In this example, the data may be located in a magnetic tape media 334 or other media. In addition, the retrieval manager 314 may indicate that the data can be found by looking to computing device 336 where a media module 338 uses data index 340 to find the exact location of the data on other storage 342.

It is understood that data may migrate from one storage media to another and the original location where the data is stored may vary over time. However, the movement of data is tracked by the respective data indexes 324, 332, and 340, so that wherever the data happens to be currently located, the software application 310 may retrieve the data without undo delay or undesired assistance.

Multiple variations exist for the computer network 300 as shown by components illustrated in dashed lines. Specifically, a manager module 346 may exist in the computing device 302 where it interacts with a media module 348 to obtain data directly from storage media 350 without having to interact with other computing devices. In other embodiments, a media module 352 may be located in the computing device 304 where data is found in storage media 354. In another embodiment, a manager module 344 may be present in the computing device 336. Those skilled in the art and viewing the present disclosure will understand that numerous possibilities exist using the same concepts.

Figure 4:
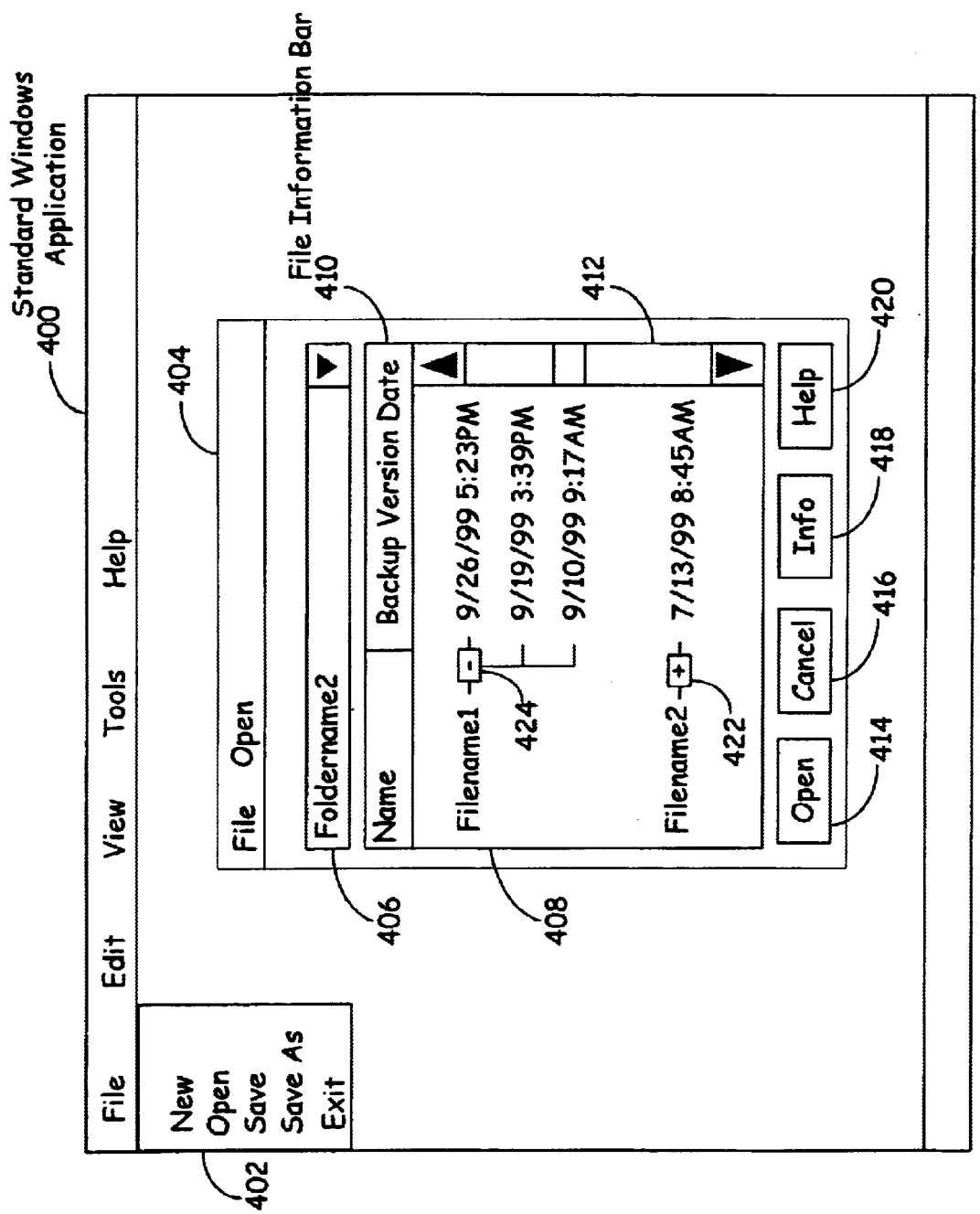
FIG. 4 illustrates an exemplary standard Windows application and how the application specific rollback of the present invention operates.

FIG. 4 illustrates an exemplary standard Windows application 400 and how the application specific rollback of the present invention operates. The standard Windows application 400 may be an application such as a word processing application and a file menu 402 may be entered when a user desires to open a file. The user will select the open option of the file menu 402 and a file open application will intercept the request to the operating system to open a file open dialog box 404.

The file open box 404 includes a folder selector box 406 where a user may enter the name of the desired folder to enter. Upon determining a folder name, e.g., foldername2, a file list 408 is displayed. The file list 408 includes a file information bar 410 that is modifiable but is shown including a name column and a backup version date column (i.e., a rollback date and time column). As with other embodiments, the file names may be listed in the file list 408 with a default backup version date of the last backup that was completed for each file or the last save that was performed on each file. In more complex embodiments, each change that occurs within each file may be tracked. If a user desires to see a detailed history of backup/change dates, the user may press a plus button 422 which will then change to a minus button 424 as illustrated in the file list 408. A scroll bar 412 is illustrated as a tool for a user to scroll through different file names to find the file which the user may desire to retrieve, and to view the different backup/change dates for a particular file.

For example, files may be retrieved immediately prior to the date that a virus was known to have infected a system, thereby providing a user with the most recent non-infected version of a file. Of course, dates may be selected immediately prior to the date of any cause of file corruption, not just for virus infection.

When a user has found the file of interest, the user may press an open button 414 to open the particular file. If a user is unable to find the desired file or desires to exit the file open dialog box 404, the user may press a cancel button 416 to exit the file open dialog box 404. The user is also able to press an information button 418 to get further information concerning each of the files. The information button 418 may allow the user to select particular options such as an "as of date", a specific date, or even a range of dates. The file open dialog box 404 is illustrated with a help button 420 that can also operate similar to common operating system help buttons.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." As used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended, such an intent will be explicitly recited in the claim, and in the absence of such recitation no such limitation is present or intended. For example, in the claims below, when a claim element is described as having "one" feature, it is intended that that element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that that element not be limited to one and only one of the feature described. Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

The above-listed sections and included information are not exhaustive and are only exemplary for an application specific rollback system according to principles of the present invention. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An application specific rollback system comprising:
    a software application that performs operations requested by a user to generate application specific data;
    the software application having an application specific rollback module with an index for assisting in locating different states of the application specific data that were generated by the user requests;
    a logical view storage that provides an organizational scheme for storage of the application specific data on one of a plurality of storage media, for migration of the application specific data to other ones of the plurality of storage media, for tracking the migration of the application specific data over time, and for maintaining the index of the software application; and
    the application specific rollback module providing access to a specific version of the application specific data when requested by a user such that the application specific data from a user selected date is accessible.

2. The application specific rollback system of claim 1 wherein a state change occurs when application specific data is migrated.

3. The application specific rollback system of claim 1 wherein a state change occurs when application specific data is edited.

4. The application specific rollback system of claim 1 wherein a state change occurs when application specific data that has been infected by a virus is altered by the virus.

5. The application specific rollback system of claim 1 wherein the software application further comprises a scroll bar for scrolling through a list of dates that correspond to state changes in the application specific data.

6. The application specific rollback system of claim 1 wherein the application specific rollback module further comprises a function for providing a copy of the specific version of the application specific data that is requested by the user.

7. The application specific rollback system of claim 6 wherein the copy of the specific version of the application specific data is saved to a storage media other than where the application specific data of interest is currently stored.

8. A method for retrieving information from a computer system comprising:
    generating information with a software application;
    storing the information through an organizational scheme provided by a logical view storage module such that the information may be migrated through different media devices depending on factors such as access to the information, storage profiles, and file storage history;
    selecting a specific date and time in the history of the information when the information existed in a state that is desirable to a user;
    requesting the software application to access the information as the information existed at the specified date and time in the history of the information; and
    storing the requested information in a new location to begin a new history of the information, the new history beginning with the information as it existed at the specified date and time that was requested by the user.

9. The method of claim 8 wherein said selecting a specific date and time in the history of the information comprises scrolling through a list of dates that indicate specific times when the state of the information was changed.

10. The method of claim 9 wherein the state change comprises migrating the information from one media device to another media device.

11. The method of claim 9 wherein the state change comprises editing the information with the software program.

12. The method of claim 9 wherein the state change comprises infecting the information with a computer virus.

13. The method of claim 12 wherein the state change comprises the virus altering the content of the application specific data.

14. The method of claim 9 wherein said storing the requested information in a new location comprises storing the information at a different media device.

* * * * *